(12) United States Patent
Dick et al.

(10) Patent No.: US 6,518,912 B1
(45) Date of Patent: Feb. 11, 2003

(54) SIGNAL PROCESSING CIRCUIT

(75) Inventors: John O. Dick, Riverside, CA (US); Erwin I. Abadie, Riverside, CA (US); Kenneth A. Lawlor, Riverside, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 04/554,637

(22) Filed: May 27, 1966

(51) Int. Cl.$^7$ .............................. F42C 13/04; G01S 7/36
(52) U.S. Cl. ............................. 342/13; 342/16; 342/17; 342/68; 102/214
(58) Field of Search ................... 325/318, 65; 307/88.5; 179/1; 343/117; 342/13, 14, 15, 16, 17, 18, 19, 68, 62, 175; 102/214

(56) References Cited

U.S. PATENT DOCUMENTS 3,929,075 A * 12/1975 Beane et al. ................ 102/214
4,093,153 A * 6/1978 Bardash et al. ............. 244/3.14
4,203,110 A * 5/1980 Dick ............................ 342/68
4,320,703 A * 3/1982 Abadie et al. ............... 102/214

* cited by examiner

*Primary Examiner*—John B. Sotomayor
(74) *Attorney, Agent, or Firm*—David Kalmbaugh

(57) ABSTRACT

A signal processing circuit is disclosed for providing fuze-on-jam capability in a target detecting device, while in the presence of continuous wave or continuous wave noise jammer signals. A target detection system will protect the target detecting device from noise jammers and continuous wave radars or continuous wave jammers by providing a circuit which samples the negative or positive bias produced by the noise modulated CW signal and produces either positive or negative polarity as seen by the antenna. If negative pulses are produced, they will actuate the target detecting gate and guard circuit and after the missile has passed the critical angle of the antenna the phase change will then produce firing in the normal manner. The sampled output is fed into the target detecting mixing circuit and no interference with normal operations of the target detecting device occurs while a fuze-on-jam or CW capability is provided.

3 Claims, 1 Drawing Sheet

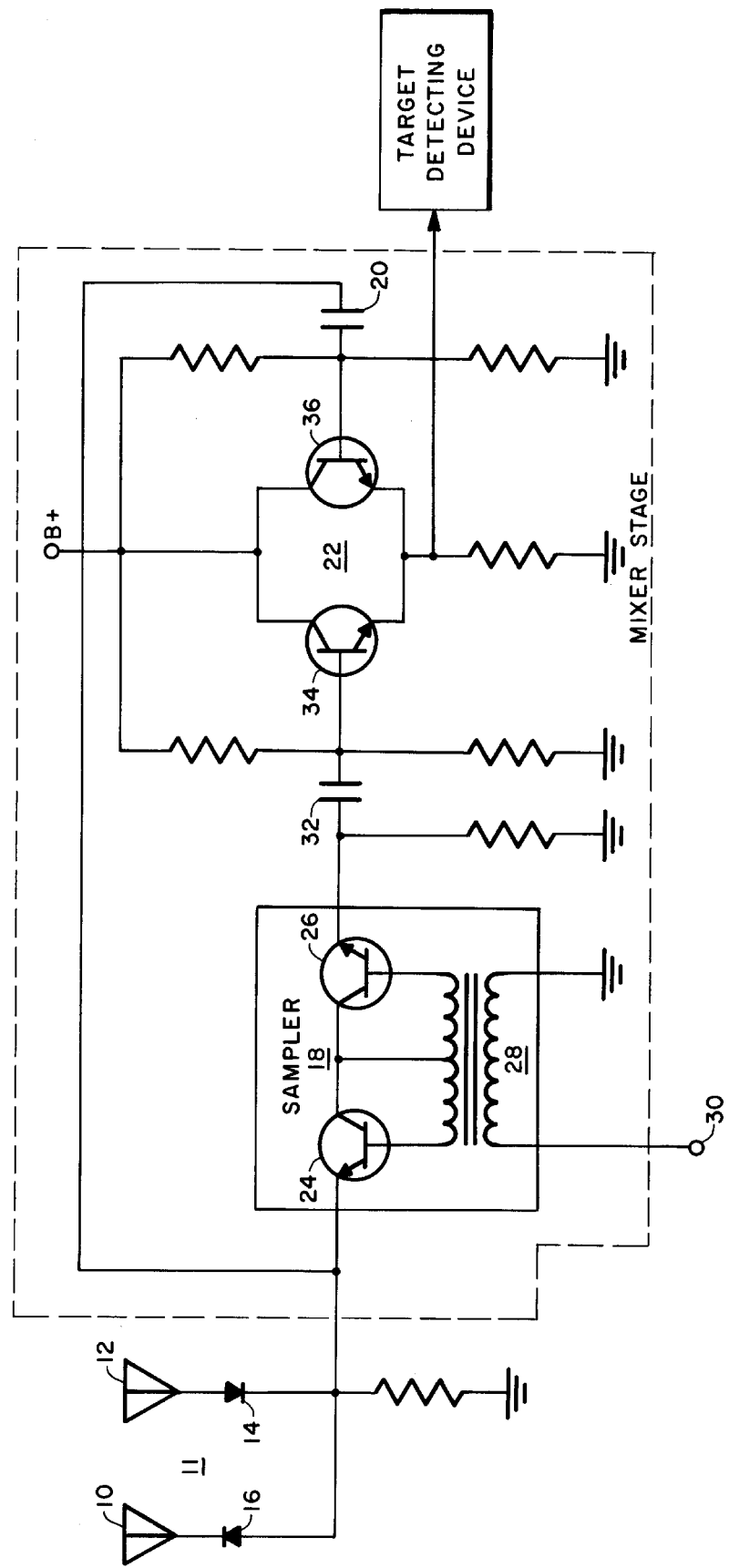

SIGNAL PROCESSING CIRCUIT

BACKGROUND OF THE INVENTION

The invention herein described may be manufactured and used by or for the Government of the United States of America for governmental purposes without the payment of any royalties thereon or therefor.

The present invention relates to signal processing circuits and more particularly to signal processing circuits for providing a fuze-on-jam capability in a target detecting device when in the presence of continuous wave or continuous wave noise jammer signals.

In known passive target detection systems carried by missiles that home on a target radar, (As for example, the target detecting device as shown and described in application Ser. No. 04/553,344 filed May 27, 1966 now U.S. Pat. No. 4,320,703 for Target Detecting Device by Erwin I. Abadie et al.) the signals received by the target detecting device from its antennas are the radar pulses transmitted by the target but appear as negative signals due to the antenna phasing. Upon close approach of the missile to the target the signal received by the antennas goes through a null at the critical angle of the antenna and reverses phase to produce a positive signal. The target detecting device is designed to prime a gate on the train of negative pulses and then to fire upon the first or second positive pulse received after the above phase reversal following antenna crossover. In the presence of continuous wave noise jammer signals, a negative bias signal with an a-c component is produced at the output of the detector stage of the target detecting device. This signal may be mistaken by the target detecting system electronics as a signal and premature firing may result. In the presence of a continuous wave radar only a direct current signal will be detected and no pulses will be present to initiate the firing circuit.

SUMMARY OF THE INVENTION

The present invention provides a modification of the prior target detection systems which will both protect the target detecting device from noise jammers and will provide fuzing capability on both noise jammers and continuous wave radars or continuous wave jammers.

The present invention provides a circuit which samples the negative or positive bias produced by the noise modulated CW signal and produces pulses of either positive or negative polarity as seen by the antenna. If negative pulses are produced, they will actuate the target detecting gate and guard circuit and after the missile has passed the critical angle of the antenna the phase change will produce a positive pulse which will then produce firing in the normal manner. Because of the manner in which the sampled output will be fed into the target detecting mixer circuit, there will be no interference with the normal operation of the target detecting device but an additional fuze-on-jam or CW capability is provided.

Accordingly, an object of the present invention is to provide a passive target detecting system which will fuze on jammer signals, continuous wave radar signals and target signals.

BRIEF DESCRIPTION OF THE DRAWINGS

Other objects and many of the attendant advantages of this invention will become readily appreciated as the same becomes better understood by reference to the following detailed description when considered in connection with the accompanying drawing wherein there is shown in the single figure a preferred embodiment of the invention.

DETAILED DESCRIPTION OF THE DRAWINGS

Referring now to the drawing, there is shown antenna 11 having receiving slots 10 and 12 for receiving signals from radiating targets. Detectors 14 and 16 which produce negative or positive signals depending upon the missile to target angle as shown and described in patent application Ser. No. 467,827 filed Jun. 24, 1965 for Fixed Angle Antenna by Clyde R. Lebsock. Prior to reaching the critical antenna angle, the dominating output signal is from slot 10 which is a negative signal and is fed to the input of sampling circuit 18. The signals received by slots 10 and 12 are also coupled through coupling capacitor 20 to the input of mixer 22. Sampler 18 comprises transistors 24 and 26 and pulse transformer 28. The secondary winding of pulse transformer 28 is connected between the base of transistor 24 and the base of transistor 26 with a center tap connected to the collectors of transistors 24 and 26. Gating pulses for sampling circuit 18 are applied to terminal 30 of the primary winding of pulse transformer 28 and may be supplied from the 3 microsecond multivibrator of the target detecting device. The output of sampler 18 is taken from the emitter of transistor 26 and coupled through coupling capacitor 32 to the base of transistor 34 of mixer 22. The output of mixer 22 is taken from the emitter of transistor 34 and the emitter of transistor 36 and fed as an input to the remainder of the target detecting system shown and described in the above referenced application of Abadie, et al.

In operation signals received by slots 10 and 12 are detected and fed to sampler 18 where the detected signals and any negative or positive bias from the detector caused by the presence of jamming signals is chopped by sampler 18 and produces a 3 microsecond pulse of either positive or negative polarity as seen by either slot 10 or 12 of antenna 11. Since the signals: fed to mixer 22 from sampler 18 appear to the electronic circuit of the target detecting device as signals received from a pulsed radar target, fuzing will be accomplished regardless of the type of signal emanated by the radiating target.

Obviously many modifications and variations of the present invention are possible in the light of the above teachings. It is therefore to be understood that within the scope of the appended claims the invention maybe practiced otherwise than as specifically described.

What is claimed is:

1. In a signal processing circuit for use in a passive target detecting device, the combination comprising:
   (a) signal receiving means for receiving signals from radiating targets for producing negative and positive output signals,
   (b) sampler circuit means coupled to said signal receiving means for periodically sampling said negative and positive signals for producing output negative and positive signals of a predetermined frequency,
   (c) mixer circuit means having a first input coupled to said signal receiving means and a second input coupled to said sampler circuit means for output pulse signals regardless of the type of signals received at said signal receiving means.

2. The signal processing circuit of claim 1 wherein said sampler circuit means comprises:
   (a) a first transistor having a base, emitter and collector,
   (b) a second transistor having a base, emitter and collector,
   (c) a pulse transformer having a center tapped secondary winding and a primary winding adapted to be connected to a source of pulses of a predetermined frequency,
   (d) said secondary winding being connected between the bases of said first and second transistors, (e) the center tap of said secondary winding being connected to each of the collectors of said first and second transistors, (f) circuit means connecting the collector of said first transistor to the collector of said second transistor.

3. The signal processing circuit of claim 1 wherein said sampler circuit means will sample the DC level of a detected CW radar signal and produce output pulses having the same pulse width as an average pulse radar pulse whereby the output pulses will be processed in the same manner by the same circuitry that processes a conventional pulse radar signal.

* * * * *